US008581563B2

(12) United States Patent
Chou et al.

(10) Patent No.: US 8,581,563 B2
(45) Date of Patent: Nov. 12, 2013

(54) POWER SUPPLY DEVICE

(75) Inventors: Wei-Chieh Chou, New Taipei (TW);
Duen-Yi Ho, New Taipei (TW);
Chun-Jen Chen, New Taipei (TW);
Tsung-Sheng Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 170 days.

(21) Appl. No.: 13/340,707

(22) Filed: Dec. 30, 2011

(65) Prior Publication Data
US 2012/0268086 A1 Oct. 25, 2012

(30) Foreign Application Priority Data
Apr. 19, 2011 (TW) .............................. 100113608 A

(51) Int. Cl.
G05F 1/575 (2006.01)
G05F 1/00 (2006.01)

(52) U.S. Cl.
USPC ......................................................... 323/282

(58) Field of Classification Search
USPC ........... 323/282, 286; 363/21.1, 21.11, 21.18, 363/26
See application file for complete search history.

(56) References Cited

U.S. PATENT DOCUMENTS 5,583,752 A * 12/1996 Sugimoto et al. .......... 363/21.11
2008/0291703 A1* 11/2008 Lee ................................. 363/26

* cited by examiner

Primary Examiner — Gary L Laxton
Assistant Examiner — Kyle J Moody
(74) Attorney, Agent, or Firm — Altis & Wispro Law Group, Inc.

(57) ABSTRACT

A power supply device includes a power supply unit and a feedback control unit. The power supply unit is configured for generating an electric potential to be provided to a load. The feedback control unit detects the electric potential and adjusts relevant parameters of the electrical potential to achieve predetermined values. The feedback control unit includes a first feedback circuit and a second feedback circuit electrically connected in series.

15 Claims, 4 Drawing Sheets

POWER SUPPLY DEVICE

BACKGROUND

1. Technical Field

The present disclosure relates to power supply devices, and particularly to a switching power supply device.

2. Description of Related Art

A switching power supply device generally includes a power supply unit and a feedback control unit. The power supply unit is configured for outputting an electrical potential, and the feedback control unit is configured for detecting the output electrical potential and adjusting relevant parameters (e.g., peak value, duty ratio, frequency, and phase) of the output electrical potential to achieve predetermined values.

A common method for adjusting the parameters of the output electrical potential using the feedback control unit is to dispose zero points and pole points in the feedback control unit. According to known automatic control theory, each of the zero points and the pole points disposed in the feedback control unit can be used to adjust the parameters of the output electrical potential to within certain ranges. The existence of more zero and pole points in the feedback control unit indicates that the parameters of the output electric potential can be adjusted in larger ranges. However, in the switching power supply devices of related art, it is difficult to dispose more than two zero points and more than three pole points in a feedback control unit. Thus, the adjustment of the parameters of the electric potentials provided by these switching power supply devices can only be carried out within a small range.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
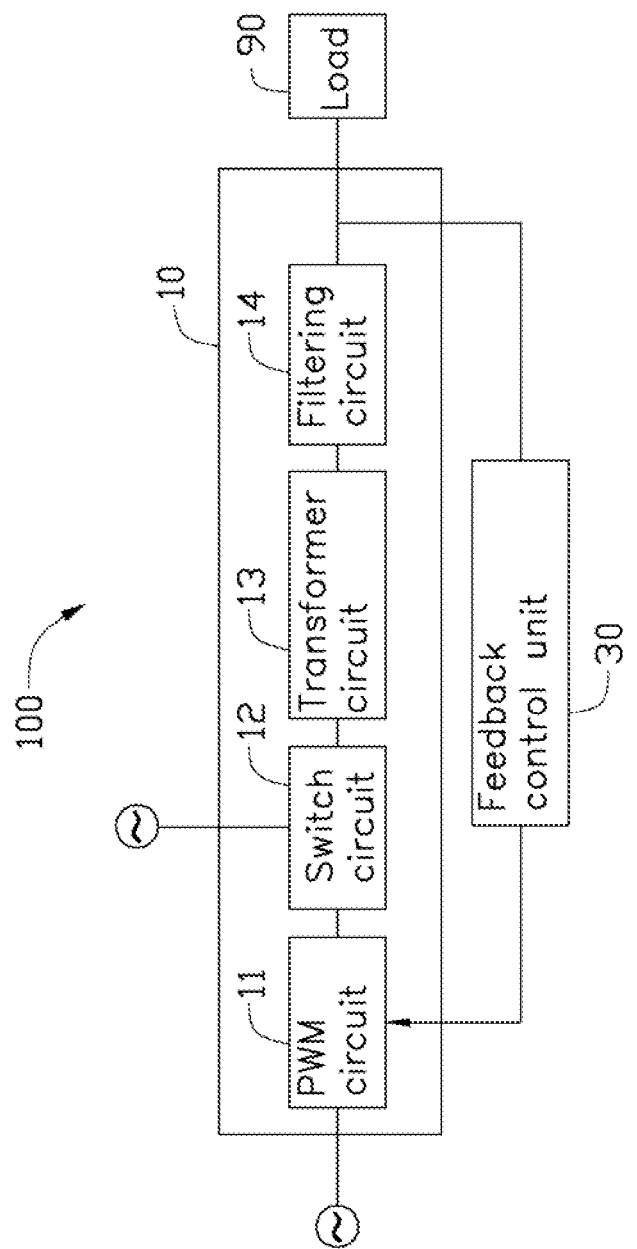
FIG. 1 is a block diagram of a power supply device, according to an exemplary embodiment.

FIG. 1 shows a power supply device 100, according to an exemplary embodiment. The power supply device 100 is a switching power supply device, and includes a power supply unit 10 and a feedback control unit 30. The power supply unit 10 can output an electric potential to a load 90, thereby supplying electric power to the load 90. The term "electric potential" as used herein includes a positive voltage, a negative voltage, and/or elements of both. The feedback control unit 30 is electrically connected to the power supply unit 10 to detect the output electrical potential and adjust parameters of the output electrical potential (e.g., peak values, duty ratio, frequency, and phase) to achieve one or more predetermined values.

The power supply unit 10 includes a pulse width modulation (PWM) circuit 11, a switch circuit 12, a transformer circuit 13, and a filtering circuit 14. The PWM circuit 11, the switch circuit 12, the transformer circuit 13, and the filtering circuit 14 are electrically connected in series. The switch circuit 12 is electrically connected to an external power supply (not labeled), and the load 90 is electrically connected to the filtering circuit 14. The feedback control unit 30 is electrically connected to the filtering circuit 14 and to the PWM circuit 11.

In use, the PWM circuit 11 generates an activation signal as input to the switch circuit 12. The activation signal is a pulsed signal and periodically turns on the switch circuit 12. When the switch circuit 12 is on, electricity from the external power supply is input to the transformer circuit 13 via the switch circuit 12. In this way, the transformer circuit 13 receives a pulsed supply of electricity, and it is readily appreciated that certain relevant parameters (e.g., the peak value, the duty ratio, the frequency, and the phase of the activation signal) are adjustable. The transformer circuit 13 transforms the pulsed electricity into a DC electric potential, and forwards the DC electric potential to the filtering circuit 14. The filtering circuit 14 can be an LC filtering circuit, which filters the DC electric potential to remove noise, and the filtered DC electric potential is passed to the load 90 as a working electric potential of the load 90.

In the aforementioned process, the filtered DC electric potential is also transmitted to the feedback control unit 30. The feedback control unit 30 detects the filtered DC electric potential and compares it with a predetermined reference electric potential Ref. The characteristics of the reference electric potential Ref, in terms of the peak value, the duty ratio, the frequency, and the phase (relevant parameters) applied to achieve it, have the values desired by a user. If the relevant parameters of the filtered DC electric potential are different to those of the reference electric potential Ref, the feedback control unit 30 can generate a compensating electric potential. The compensating electric potential is transmitted to the PWM circuit 11 and controls the PWM circuit 11 to adjust the parameters applied to the activation signal, and thereby to the pulsed electric potential received by the transformer circuit 13, and finally causing the filtered DC electric potential to possess the same values as that of the reference electric potential Ref. Particular methods for the detection, the comparison, and the adjustment are detailed hereafter.

Figure 2:
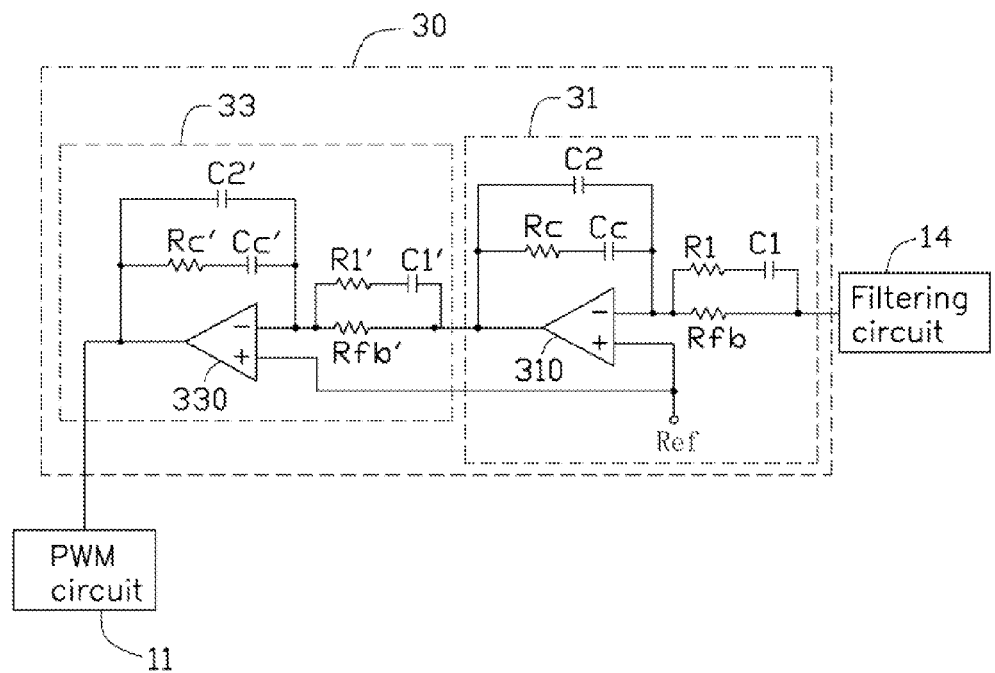
FIG. 2 is a circuit diagram of a feedback control unit of the power supply device shown in FIG. 1.

Also referring to FIG. 2, the feedback control unit 30 includes a first feedback circuit 31 and a second feedback circuit 33, and both of the first feedback circuit 31 and the second feedback 33 can be type-III compensation networks. The first and second feedback circuits 33 are electrically connected in series between the filtering circuit 14 and the PWM circuit 11. The first feedback circuit 31 includes an operational amplifier 310, resistors R1, Rc, and Rfb, and capacitors C1, C2, and Cc. The resistor R1 and the capacitor C1 are electrically connected in series between the filtering circuit 14 and a negative input end of the operational amplifier 310. The resistor Rfb is electrically connected between the filtering circuit 14 and the negative input end of the operational amplifier 310. The resistor Rc and the capacitor Cc are electrically connected in series between the negative input end of the operational amplifier 310 and an output end of the operational amplifier 310. The capacitor C2 is electrically connected between the negative input end of the operational amplifier 310 and the output end of the operational amplifier 310.

The second feedback circuit 33 includes an operational amplifier 330, resistors R1', Rc', and Rfb', and capacitors C1', C2', and Cc'. The characters used in naming these last-mentioned individual resistors and capacitors have the same significance as previously used. The resistor R1' and the capacitor C1' are electrically connected in series between the output end of the operational amplifier 310 and a negative input end of the operational amplifier 330. The resistor Rfb' is electrically connected between the output end of the operational amplifier 310 and the negative input end of the operational amplifier 310. The resistor Rc' and the capacitor Cc' are electrically connected in series between the negative input end of the operational amplifier 330 and an output end of the operational amplifier 330. The capacitor C2' is electrically connected between the negative input end of the operational amplifier 330 and the output end of the operational amplifier 330. The output end of the operational amplifier 330 is electrically connected to the PWM circuit 10.

In use, the reference electric potential Ref is input to the positive input ends of the operational amplifiers 310, 330. The negative input end of the operational amplifier 310 receives the filtered DC electric potential from the filtering circuit 14. Thus, the operational amplifier 310 compares the filtered DC electric potential with the reference electric potential Ref, and generates a first compensation electric potential at the output end of the operational amplifier 310. The relevant parameters of the first compensation electric potential are fixed by the resistance values of the resistors R1, Rc, and Rfb and by the capacitance values of the capacitors C1, C2, and Cc. In particular, a transfer function $|G1(s)|$ of the first feedback circuit 31 can be indicated by the following equation:

$$|G1(s)| = \frac{Rfb + R1}{Rfb * R1 * C2} * \frac{\left(s + \frac{1}{Rc * Cc}\right) * \left(s + \frac{1}{(Rfb + R1) * C1}\right)}{s * \left(s + \frac{C2 + Cc}{Rc * C2 * Cc}\right) * \left(s + \frac{1}{R1 * C1}\right)}$$

In this equation and in other equations for indicating transfer functions, the character "s" means a variable of the transfer functions. According to known automatic control theory, it is readily appreciated that the first feedback circuit 31 has two zero points and three pole points.

The first compensation electric potential is transmitted to the negative input end of the operational amplifier 330. The operational amplifier 330 compares the first compensation electric potential with the reference electric potential Ref, and generates a second compensation electric potential on the output end of the operational amplifier 330. The relevant parameters of the second compensation electric potential are fixed by the resistance values of the resistors R1', Rc', and Rfb' and by the capacitance values of the capacitors C1', C2', and Cc'. In particular, a transfer function $|G2(s)|$ of the second feedback circuit 33 can be indicated by the application of the following equation:

$$|G2(s)| = \frac{Rfb' + R1'}{Rfb' * R1' * C2'} * \frac{\left(s + \frac{1}{Rc' * Cc'}\right) * \left(s + \frac{1}{(Rfb' + R1') * C1'}\right)}{s * \left(s + \frac{C2' + Cc'}{Rc' * C2' * Cc'}\right) * \left(s + \frac{1}{R1' * C1'}\right)}$$

According to known automatic control theory, it is readily appreciated that the second feedback circuit 33 has two zero points and three pole points.

The second compensation electrical potential is used as a final output of the feedback control unit 30, and is transmitted to the PWM circuit 11 and controls the PWM circuit 11 in accordance with the relevant parameters applied to the activation signal, thereby resulting in a filtered DC electric potential with the same values as that of the reference electric potential Ref. A transfer function $|G(s)|$ of the feedback control unit 30 can be indicated by the following equation because the first feedback circuit 31 and the second feedback circuit 33 are electrically connected in series:

$$|G(s)| = $$

$$|G1(s)| * |G2(s)| = \frac{Rfb + R1}{Rfb * R1 * C2} * \frac{\left(s + \frac{1}{Rc * Cc}\right) * \left(s + \frac{1}{(Rfb + R1) * C1}\right)}{s * \left(s + \frac{C2 + Cc}{Rc * C2 * Cc}\right) * \left(s + \frac{1}{R1 * C1}\right)} *$$

$$\frac{Rfb + R1'}{Rfb' * R1' * C2'} * \frac{\left(s + \frac{1}{Rc' * Cc'}\right) * \left(s + \frac{1}{(Rfb' + R1') * C1'}\right)}{s * \left(s + \frac{C2' + Cc'}{Rc' * C2' * Cc'}\right) * \left(s + \frac{1}{R1' * C1'}\right)}$$

According to known automatic control theory, it is readily appreciated that the feedback control unit has four zero points and six pole points.

The power supply device 100 in this embodiment can adjust the parameters of the DC electric potential provided to the load 90 in larger ranges, because the feedback control unit 30 has more zero points and more pole points than the switching power supply devices of related art. For example, the comparisons in respect of gain adjusting capability and phase adjusting capability of the power supply device 100 between the power supply device 100 and a switching power supply device having two zero points and three pole points, as in related art, are detailed as follows.

Figure 3:
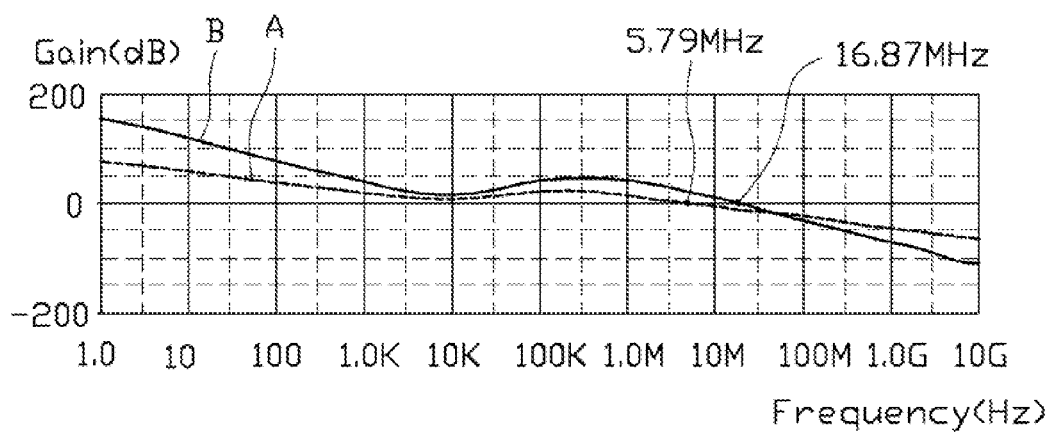
FIG. 3 is a curve diagram which compares a gain of the feedback control unit shown in FIG. 2 with a gain of a feedback control unit of a switching power supply device of related art.

Referring to FIG. 3, a curve A, in relation to the related art switching power supply device, represents a relation between a gain generated and a frequency of an electric potential input, and a curve B, in relation to the feedback control unit 10, represents the same relation.

According to known automatic control theory, each zero point of a circuit can increase a slope of a curve that represents a relation between gain generated by the circuit and the frequency of an input of the circuit. The curve B has a larger slope than the curve A because the feedback control unit 30 has more zero points than the switching power supply device of related art. In this way, the gain generated by the feedback control unit 30 can be larger than the gain generated by the related art switching power supply device when both the feedback control unit 30 and the typical switching power supply device receive a same electric potential having a relatively low frequency (e.g., less than 1 KHz), and can be less than the gain generated by the typical switching power supply device when both the feedback control unit 30 and the typical switching power supply device receive a same electric potential having a relatively high frequency (e.g., more than 100 MHz). Larger gains can be provided from the feedback control unit 30 than from the typical switching power supply device because the DC electric potential provided to the load 90 generally has relatively low frequencies, and adjustments can be carried out more precisely by the feedback control unit 30 than by the related art switching power supply device.

Noise, or a noisy signal, gets less gain from the feedback control unit 30 than from the typical switching power supply because the electric potentials of noise, or noisy electric potentials, generally have relatively high frequencies, and the feedback control unit 30 can therefore achieve more in decreasing noise than the typical switching power supply device.

Figure 4:
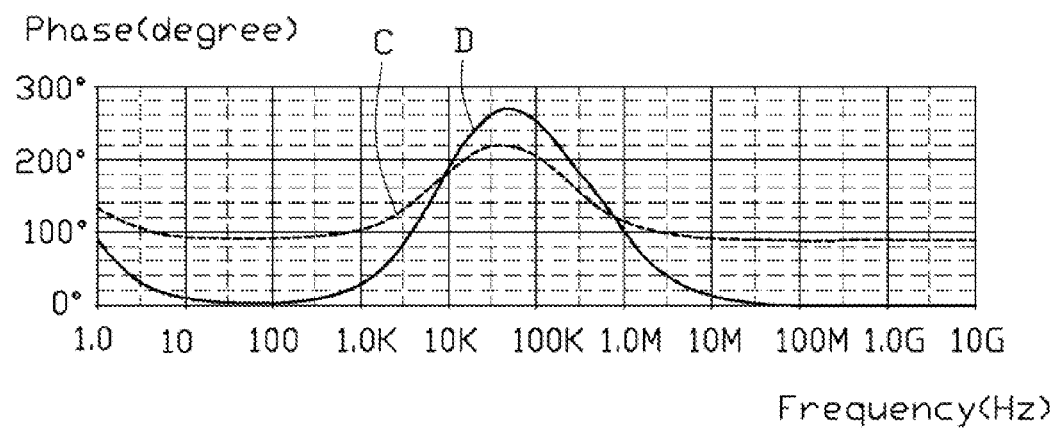
FIG. 4 is a curve diagram which compares a phase of the feedback control unit shown in FIG. 2 with a phase of a feedback control unit of a switching power supply device of related art.

Referring to FIG. 4, a curve C, relating to the switching power supply device of related art, represents a relation between phase and frequency of an electric potential input, and a curve D, relating to the feedback control unit 10, represents a relation between phase and frequency of an electric potential input.

According to known automatic control theory, each pole point of a circuit can increase a phase of the circuit. The curve D has a larger slope than the curve C because the feedback control unit 30 has more pole points than the related art switching power supply device. In this way, a larger range is available for the phase of the feedback control unit 30 than is available for the phase of the related art switching power supply device.

Furthermore, since the phase range of the feedback control unit 30 is larger than that of the related art switching power supply device, the feedback control unit 30 can have a larger bandwidth for normally generating compensation electric potentials than the related art switching power supply device. For example, as shown in FIG. 3, a bandwidth enabling the related art switching power supply device to normally generate compensation electric potentials (i.e., a frequency range in which the gain generated by the typical switching power supply device is positive) is about 0-5.79 MHz, and a bandwidth enabling the feedback control unit 30 to normally generate compensation electric potentials (i.e., a frequency range in which the gain generated by the feedback control unit 30 is positive) is about 0-16.87 MHz.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A power supply device, comprising:
   a power supply unit configured for generating an electric potential provided to a load; and
   a feedback control unit electrically connected to the power supply unit; the feedback control unit detecting the electric potential and adjusting relevant parameters of the electrical potential to predetermined values;
   wherein the feedback control unit includes a first feedback circuit and a second feedback circuit electrically connected in series;
   wherein the first feedback circuit includes a first operational amplifier, an input end of the first operational amplifier electrically connected to the power supply unit via a first resistor and a first capacitor electrically connected in series, and further electrically connected to the power supply unit via a second resistor; an output end of the first operational amplifier electrically connected to the input end of the first operational amplifier via a third resistor and a second capacitor electrically connected in series; and further electrically connected to the input end of the first operational amplifier via a third capacitor; and
   wherein the second feedback circuit includes a second operational amplifier, an input end of the second operational amplifier electrically connected to the output end of the first operational amplifier via a fourth resistor and a fourth capacitor electrically connected in series, and further electrically connected to the output end of the first operational amplifier via a fifth resistor; an output end of the second operational amplifier electrically connected to the input end of the second operational amplifier via a sixth resistor and a fifth capacitor electrically connected in series, and further electrically connected to the input end of the second operational amplifier via a sixth capacitor.

2. The power supply device as claimed in claim 1, wherein a transfer function of the feedback control unit has more than two zero points and more than three pole points.

3. The power supply device as claimed in claim 2, wherein each of transfer functions of the first feedback circuit and the second feedback circuit has two zero points and three pole points.

4. The power supply device as claimed in claim 1, wherein the first resistor and the first capacitor are electrically connected in series between the power supply unit and a negative input end of the first operational amplifier; the second resistor is electrically connected between the power supply unit and the negative input end of the first operational amplifier; the third resistor and the second capacitor are electrically connected in series between the negative input end of the first operational amplifier and the output end of the first operational amplifier; and the third capacitor is electrically connected between the negative input end of the first operational amplifier and the output end of the first operational amplifier.

5. The power supply device as claimed in claim 4, wherein the fourth resistor and the fourth capacitor are electrically connected in series between the output end of the first operational amplifier and a negative input end of the second operational amplifier; the fifth resistor is electrically connected between the output end of the first operational amplifier and the negative input end of the second operational amplifier; the sixth resistor and the fifth capacitor are electrically connected in series between the negative input end of the second operational amplifier and the output end of the second operational amplifier; and the sixth capacitor is electrically connected between the negative input end of the second operational amplifier and the output end of the second operational amplifier.

6. The power supply device as claimed in claim 5, wherein a reference electric potential is input to positive input ends of the first and second operational amplifiers; the first operational amplifier compares the electric potential with the reference electric potential and correspondingly generates a first compensation electric potential; the second operational amplifier compares the first compensation electric potential with the reference electric potential and correspondingly generates a second compensation electric potential; and the second compensation electrical potential is transmitted to the power supply unit and to adjust the relevant parameters of the electric potential to have the same values as that of the reference electric potential.

7. The power supply device as claimed in claim 6, wherein the power supply unit includes a pulse width modulation (PWM) circuit, a switch circuit, a transformer circuit, and a filtering circuit; the PWM circuit, the switch circuit, the transformer circuit, and the filtering circuit electrically connected in series, the PWM circuit controlling the switch circuit to input a pulse electric potential to the transformer circuit, the transformer circuit transforming the pulse electric potential into a direct current (DC) electric potential, and the filtering circuit filtering the DC electric potential to generate the electric potential.

8. The power supply device as claimed in claim 7, wherein the first resistor and the first capacitor are electrically connected in series between the filtering circuit and the negative input end of the first operational amplifier, the second resistor is electrically connected between the filtering circuit and the negative input end of the first operational amplifier, and the filtering circuit transmits the electric potential to the first feedback circuit.

9. The power supply device as claimed in claim 8, wherein the output end of the second operational amplifier is electrically connected to the PWM circuit to transmit the second compensation electric potential to the PWM circuit and control the PWM circuit to adjust the relevant parameters of the electric potential.

10. The power supply device as claimed in claim 1, wherein the relevant parameters of the electric potential includes peak value, duty ratio, frequency, and phase of the electric potential.

11. A feedback control circuit electrically connected between a filtering circuit and a pulse width modulation circuit, the feedback control circuit comprising:
a first feedback circuit and a second feedback circuit electrically connected in series;
wherein the first feedback circuit comprises a first operational amplifier comprising a first input node, a second input node, and a first output node, the first input node is connected to the first output node via a first impedance circuit, and connected to the filtering circuit via a second impedance circuit;
wherein the second feedback circuit comprises a second operational amplifier comprising a third input node, a fourth input node, and a second output node, the second output node connected to the third input node via a third impedance circuit, the second output node also connected to the pulse width modulation circuit, wherein the second input node is connected to the fourth input node and further connected to a voltage reference source, and wherein the first output node is connected to the third input node via a fourth impedance circuit.

12. The feedback control circuit of claim 11, wherein the first impedance circuit comprises a first resistor in parallel with a second resistor and a first capacitor connected in series.

13. The feedback control circuit of claim 11, wherein the second impedance circuit comprises a third resistor in parallel with a fourth resistor and a second capacitor connected in series.

14. The feedback control circuit of claim 11, wherein the third impedance circuit comprises a third capacitor in parallel with a fifth resistor and a fourth capacitor connected in series.

15. The feedback control circuit of claim 11, wherein the fourth impedance circuit comprises a sixth resistor in parallel with a seventh resistor in series with a fifth capacitor.

* * * * *